UNITED STATES PATENT OFFICE.

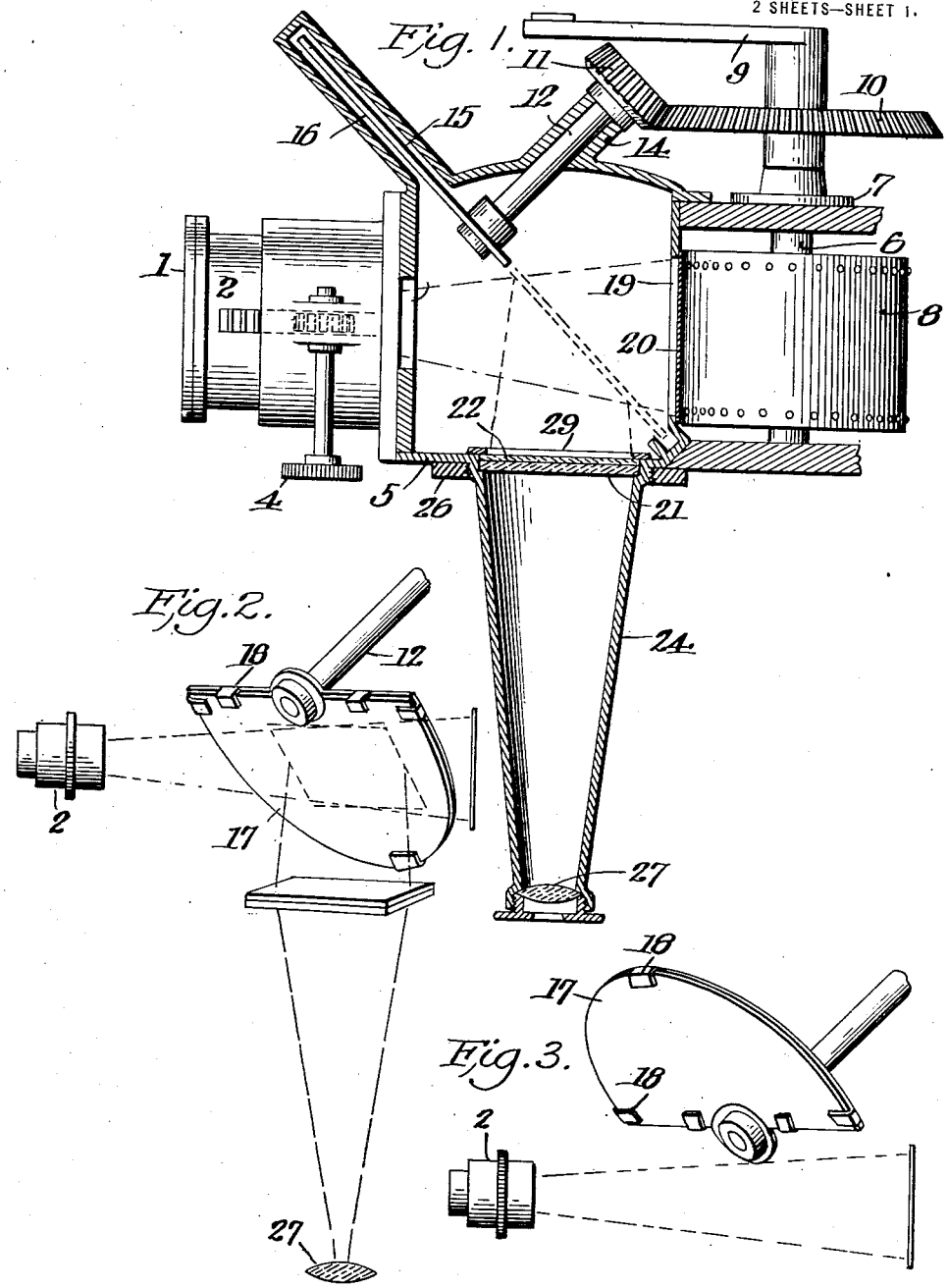

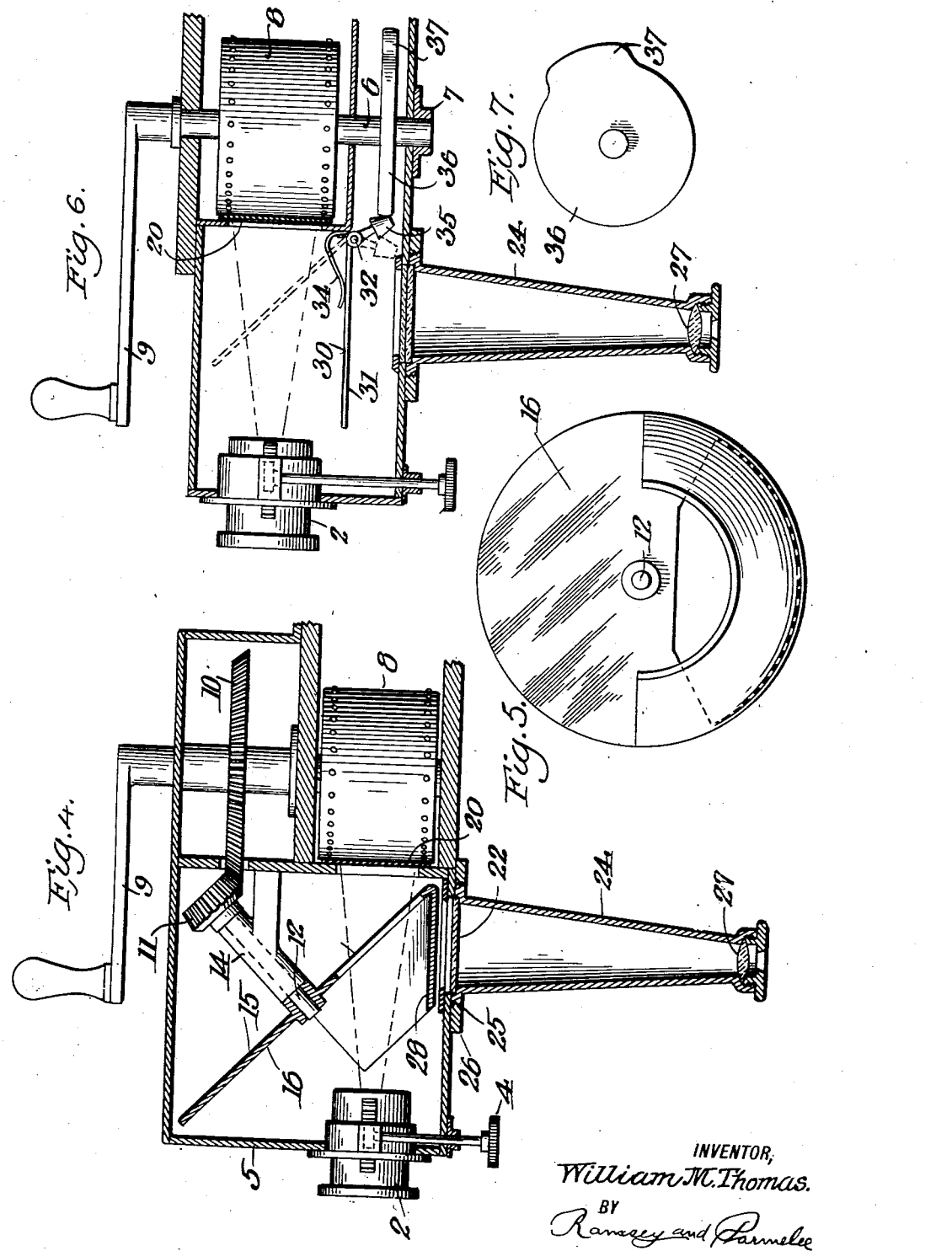

WILLIAM M. THOMAS, OF NEW YORK, N. Y., ASSIGNOR TO THOMAS-OBERKIRCH COMPANY, LIMITED, A CORPORATION OF NEW YORK.

DIRECT-VISION VIEW-FINDER FOR MOTION-PICTURE CAMERAS.

1,353,191.

Specification of Letters Patent.  Patented Sept. 21, 1920.

Application filed April 19, 1917. Serial No. 163,267.

*To whom it may concern:*

Be it known that I, WILLIAM M. THOMAS, a citizen of the United States, and a resident of the city of New York, in the county of New York, State of New York, have invented certain new and useful Improvements in Direct-Vision View-Finders for Motion-Picture Cameras, of which the following is a specification.

This invention relates broadly to cameras and more specifically to a camera adapted for taking motion pictures.

The principal object of the present invention is to provide a moving picture camera with a direct image view finder adapted to reflect the scene being photographed through the objective lens when the shutter is effective to cut off the light rays from the film and provide against light striking the film through the view finder when the film is exposed to the rays through the objective lens.

Other and further objects of the present invention will in part be obvious and will in part be pointed out hereinafter in the specification following by reference to the accompanying drawings forming a part of the said specification. Throughout the specification and drawings like characters will be used to represent like parts.

Figure 1 is a more or less diagrammatic view illustrating one form of construction embodying my invention.

Fig. 2 is a diagrammatic view illustrating the shutter effective to intercept the light from the sensitive element and to reflect the image upon a suitable screen.

Fig. 3 illustrates the shutter in a different position wherein the shutter is ineffective and the light from the lens is focused directly on the light sensitive element.

Fig. 4 illustrates a slightly different construction embodying my invention.

Fig. 5 is an end view of the shutter shown in Fig. 4.

Fig. 6 illustrates a further type of construction carrying out my invention by means of an oscillating shutter.

Fig. 7 is a plan view of the cam 33 for operating the shutter shown in Fig. 6.

Referring now to the drawings and more particularly to Figs. 1, 2 and 3, the objective lens 1 of the usual type is mounted in a suitable lens tube 2 and is provided with the usual focusing mechanism 4, all of which is suitably positioned on the front of the main casing 5. The main drive shaft 6 is suitably journaled in a portion of the main frame, as at 7, and carries a film feeding sprocket 8. Since the view finder, which will be more completely described hereinafter, is capable of operation with many types of film feed only the sprocket wheel of the film feed is illustrated. It may be stated, however, that the machine which has been built including the present invention used the type of film feed disclosed in my prior application Serial No. 55,875, filed October 14, 1915. The main drive shaft 6 may be rotated through any suitable mechanism, but preferably by means of a hand crank 9 and this shaft carries a large bevel driving gear 10. This bevel driving gear 10 engages a bevel pinion 11 mounted upon the shutter shaft 12 which is angularly disposed in a bearing 14 in the main casing 5. This shutter shaft 12 on its inner end carries a segment of a rotating shutter 15 and as illustrated the angularity of the shutter shaft 12 is such that the plane of rotation of the shutter 15 is substantially forty-five degrees to the axis of the objective lens 1. The shutter 15 may be provided on its front face, as at 16, with a polished reflecting surface, or the shutter may carry as a separate member a segment of mirror 17 which may be secured by means of lugs 18. Directly back of the shutter is provided a flat guide-way 19 for positioning a section of film 20 in the focus of the objective lens 1. A ground glass screen 21 is secured in the side of the casing 5 and is positioned the same relative distance from the reflecting surface 16 as is the film 20. It, therefore, will be seen that when the shutter is effective to intercept the rays of light from the film, as indicated in dotted lines in Fig. 1, the image from the objective lens will be focused directly on the ground glass screen 21. In order to obviate any possibility of light leaking through the ground glass and thereby light striking the film when the shutter is in the position shown by full lines in Fig. 1, an actinic ray screen 22, comprising a sheet of ruby glass or similar material, may be positioned adjacent the ground glass. In order to render the scene on the ground glass clearer it has been found desirable to hood the ground glass by means of a light insulating tube 24 which may be screw threaded, as at 25, into a suitable base 26 on the side of the main casing 5. Since the size of the field of the motion picture lens is usually small it is desirable to view the actual field photographed on a larger scale and to this end the hood tube 24 is provided with a magnifying eye piece 27 whereby the operator may view a magnified image of the actual scene being photographed.

Referring now to Fig. 4 it will be noted that the actinic light screen is omitted and in order to provide against light striking the film through the ground glass a conical shaped wall 28 is provided on a portion of the shutter opposite the reflecting surface 16 and adjacent the exposure opening 29. This conical shaped wall 28 is in effect a shutter operating adjacent the ground glass when the main shutter is opened to permit direct rays through the objective lens 1 to be focused on the film 20.

In Fig. 6 is illustrated another form of carrying out the invention by means of an oscillating shutter 30 which is provided on its front face with a reflecting surface 31 and is mounted to oscillate about a hinge 32. A suitable leaf spring 34 may be provided for normally urging an anti-friction roll 35 against a shutter cam 36 so that as the cam rotates the operating projection 37 will move the roll 35 forwardly to swing the shutter 30 across the rays of light from the objective lens 1 thereby intercepting the rays normally focused on the film and reflecting the same into the ground glass screen 21.

Realizing that my invention is capable of embodiment in structures other than the specific mechanisms herein disclosed I desire it to be understood that the disclosure herewith is illustrative and not to be considered in the limiting sense.

Having thus described my invention what I claim is:—

1. In a motion picture camera; walls forming a shutter chamber having a film exposure opening formed in one wall and an observation window formed in another wall, said walls forming a dihedral angle of approximately 90 degrees; a lens system arranged to focus through said film opening; a primary shutter located between said lens system and said film exposure opening and continuously rotatable in a plane at an angle of 45° with the axis of the lens system, a reflecting surface on said shutter and rotatable therewith adapted while rotating to reflect the light from said lens system through said observation window, a secondary shutter rotatable in unison with and arranged at an angle of 45° to said primary shutter and to the reflecting surface for closing said window when said primary shutter is in position to admit light to said film exposure opening, and means for continuously and synchronously rotating said shutters and the reflecting surface to alternately expose the window and said opening at regular intervals.

2. In a moving picture instrument, a lens, a light sensitive element in the focus of said lens, a shutter, a mirror mounted upon said shutter, optical means to view the image reflected from said mirror when said shutter is operative, and means whereby said shutter is effective to prevent the light sensitive element from being light struck through said optical means when said light sensitive element is exposed to rays of light coming through said lens.

3. In a moving picture instrument, in combination, a lens, a light sensitive element in the focus of said lens, a rotary shutter, means carried by said shutter and effective to deflect the rays of light from said lens when said shutter is effective, optical means for viewing the deflected light rays, and shutter means for intercepting rays of light through said optical means when the light sensitive member is exposed to light rays passing through said lens.

4. In a moving picture instrument, in combination, a lens, a light sensitive element in the focus of said lens, a rotary shutter angularly disposed relatively to the axis of said lens, a mirror mounted upon said rotary shutter, a ground glass, and a member carried by said rotary shutter and comprising a shutter preventing light leakage through said ground glass when the light sensitive element is exposed to light rays through said lens.

WILLIAM M. THOMAS.